R. KECK.
UNIVERSAL JOINT.
APPLICATION FILED JULY 23, 1918.
1,418,380.
Patented June 6, 1922.
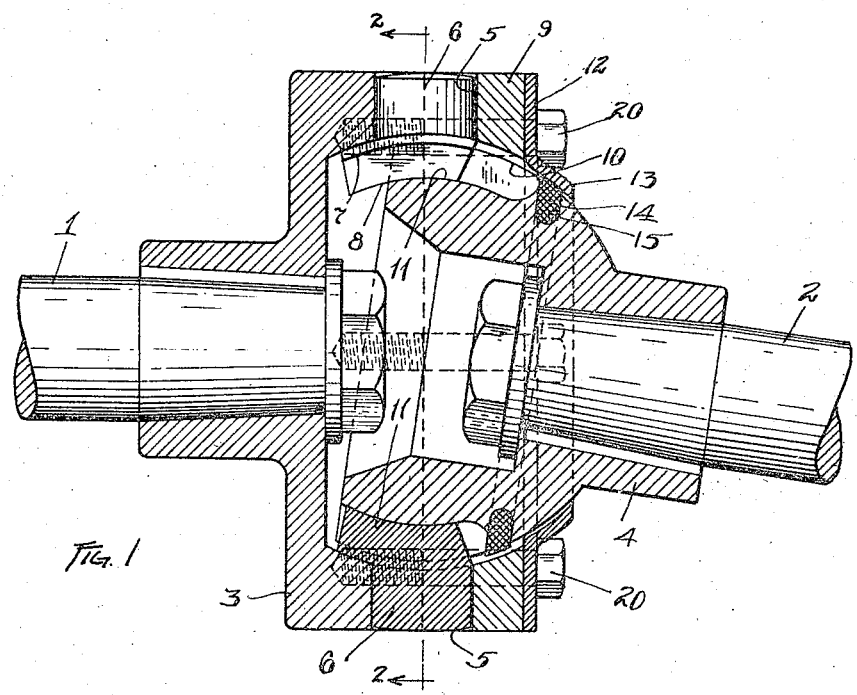
Fig. 1
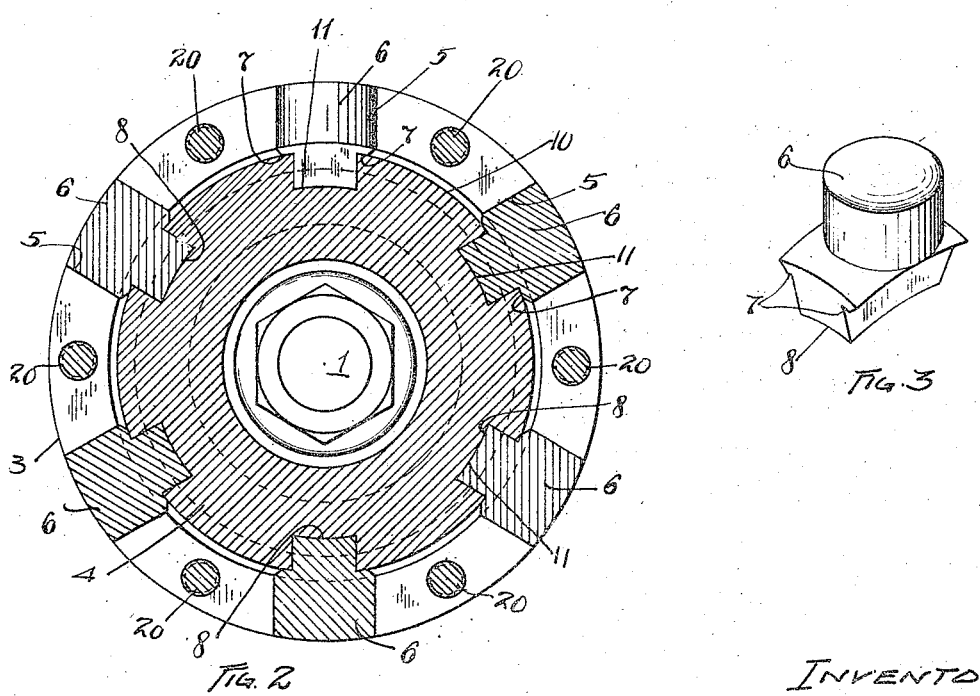
Fig. 2
Fig. 3
INVENTOR
Robert Keck
By Fay, Oberlin & Fay.
ATTORNEYS.

UNITED STATES PATENT OFFICE.

ROBERT KECK, OF CHICAGO, ILLINOIS, ASSIGNOR TO THE DOUBLE-DRIVE TRUCK COMPANY, OF CHICAGO, ILLINOIS, A CORPORATION OF SOUTH DAKOTA.

UNIVERSAL JOINT.

1,418,380.  Specification of Letters Patent.  Patented June 6, 1922.

Application filed July 23, 1918. Serial No. 246,284.

*To all whom it may concern:*

Be it known that I, ROBERT KECK, a citizen of the United States, and a resident of Chicago, county of Cook, and State of Illinois, have invented a new and useful Improvement in Universal Joints, of which the following is a specification, the principle of the invention being herein explained and the best mode in which I have contemplated applying that principle, so as to distinguish it from other inventions.

The present invention, relating, as indicated, to universal couplings, is particularly directed to the provision in a universal coupling or joint of means adapted to permit of a considerable angle between the driving and driven members of the coupling, with a minimum of friction between these two parts. A further object of the invention is the provision of a simple universal joint which may be readily assembled and dis-assembled. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a longitudinal section through my improved coupling; Fig. 2 is a transverse section on the plane indicated by the line 2—2, Fig. 1; and Fig. 3 is a view in perspective of one portion of the mechanism.

In Fig. 1 there are shown driving and driven members 1 and 2 respectively, to which are suitably attached complementary coupling members 3 and 4 respectively. The shaft 1 may be considered as the driving shaft, and the coupling member 3 as the driving member of the universal coupling, while the shaft 2 and coupling member 4 may be regarded as the driven parts of the coupling.

The two members 3 and 4 are provided with complementary, spherically formed engaging portions which permit not only of a turning of the member 4 with respect to the member 3 in the plane represented by the surface of the sheet of drawing, but prevent any relative axial rotation between these two members. The member 3 is provided with a series of radially arranged recesses 5 within which are mounted ribs 6, each of which is provided with a spherically formed surface 7 adapted to fit snugly against a similarly formed surface on the inner portion of the member 3, and with a second spherically formed surface 8. These ribs 6 are held in position in the recesses 5 by means of a cover plate 9 which is bolted thereto, and which also serves to enclose and retain in engagement with spherically formed surfaces 7 and 8 on members 3 and 6, the driven member 4 of the coupling. The construction of the members 3 and 4 is apparent from Fig. 1, these parts being hollowed out and bolted to the shafts 1 and 2 respectively, and being capable, by reason of these hollow centers, of a large angularity with respect to each other.

The driven member 4 is formed with two sets of spherically formed surfaces, the first set of such surfaces 10 being formed to engage against the surfaces 7 on the inner portion of the rib 6, while the second set of spherically formed surfaces 11 on the member 4 are formed in recesses cut therein, adapted to receive the ribs 6, while the surfaces 11 are in engagement with the surfaces 8 on these ribs. There is thus a large surface area of contact between the driving and driven members, although this contact is secured through broken or interrupted surfaces, a portion being between the surfaces 7 and 10, and the remainder between the surfaces 8 and 11. By thus providing such a considerable amount of bearing surface between the driving and driven members of the coupling, the wear is distributed throughout this entire surface, and no looseness will result even after long periods of use while engagement of the ribs 6 in the recesses having the surfaces 11 prevents any relative rotation of movement between the driving and driven members.

A cover plate 12 is fastened to the outer side of the member 9 by being positioned beneath the bolts 20 which secure the ring or plate 9 to the member 3, and this cover plate 12 is provided with a spherically formed flange 13 which fits loosely about the extending portion of the spherically formed member 4. Between the cover plate 13 and the member 4, there is provided a packing gland 14, the packing material being set into a recess 15 formed in the member 4, and as there is no other opening between members 3 and 4 except around the cover plate 12, the use of the packing gland between these two members renders it possible for the universal joint to be packed with lubricant and to be kept tight during its use. This is a feature of some importance, as many universal joints in common use are extremely difficult to lubricate, and must often be protected by flexible covers of leather or other material which is not a satisfactory means of retaining lubricant.

It will be observed that the recesses in the member 4 for the ribs 6 extend from the inner edge of the member 4 to a point which, when the driving and driven members are in substantial alinement, lies in a plane substantially flush with the outer surface of the cover plate 9, and that the spherical surfaces or recess engaging portions of the ribs 6 extend inwardly and beyond that portion of the ribs engaging the member 3, thus affording considerable surface engagement between the member 4 and the ribs 6 and permitting ample range of angular movement on the parts of the coupling; and by this construction and the provision of the cover plate 12 and the packing 14 carried by the member 4 an oil-tight and dust-proof joint is always maintained between the two members of the joint during the relative angular movements of the parts.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a universal coupling, the combination of a driving and a driven shaft, hollow members rigidly secured to the ends of said respective shafts, spherical surfaces formed on the inner portion of the driving member and the outer portion of the driven member, a plurality of longitudinal grooves formed in the outer surface of said driven member, a plurality of ribs having spherical top and bottom surfaces and lateral shoulders forming spherical bearing contacts interposed between the driving and driven members and partially received within said longitudinal grooves formed in the outer surface of said driven member, positioning studs formed on the forward ends of said respective ribs, and sockets in said driving member receiving said studs.

2. In a universal coupling, the combination of a driving and a driven shaft, hollow members rigidly secured to the ends of said respective shafts, spherical surfaces formed on the inner portion of the driving member and the outer portion of the driven member, a plurality of longitudinal grooves formed on the outer surface of said driven member, a packing groove formed circumferentially of said driven member adjacent its outer end, a packing ring seated in said groove and adapted to wipe the inner surface of said driving member, a cover plate mounted on said driving member and adapted to contact with the outer surface of said driven member and with said packing ring at its greatest outward distance of travel, a plurality of ribs having spherical top and bottom surfaces and lateral shoulders forming spherical bearing contacts, interposed between the driving and driven members and their lower portions closely received within said grooves formed in the outer surface of said driven member, positioning studs formed on the forward ends of said respective ribs, and sockets in said driving member receiving said studs.

Signed by me, this 17 day of July, 1918.

ROBERT KECK.